United States Patent
Curran et al.

[11] 3,907,899
[45] Sept. 23, 1975

[54] NOVEL THIOLS AND DISULPHIDES

[75] Inventors: Adrian Charles Ward Curran; Roger Crossley, both of Reading, England

[73] Assignee: John Wyeth & Brother Limited, Maidenhead, England

[22] Filed: Mar. 18, 1974

[21] Appl. No.: 452,029

[30] Foreign Application Priority Data
Mar. 29, 1973 United Kingdom............... 15066/73

[52] U.S. Cl. ......... 260/609 D; 260/608; 260/551 S; 260/465 E
[51] Int. Cl.² ...................................... C07C 149/00
[58] Field of Search............ 260/608, 609 R, 609 D

[56] References Cited
OTHER PUBLICATIONS
Gatewood et al., J.A.C.S., Vol. 50, pp. 1422–1427.
Kharasch–Tarbell, Org. Sulfur Compound, Vol. I, pp. 97–102.
Cook et al., J. Chem. Soc., (1949), pp. 10614.
Chem. Abstract – Amino–Nitriles (1949), pp. 1061–1064.
Chem. Abstract – Amino And Imino Acid Nitriles, Vol. 50, pp. 1422–1427.
Chem. Abstract – Oxidation of Thiols to Disulfides, pp. 97–102.

*Primary Examiner*—Lewis Gotts
*Assistant Examiner*—D. R. Phillips

[57] ABSTRACT

The invention provides a process for preparing a thiol of formula I or a disulphide of formula II

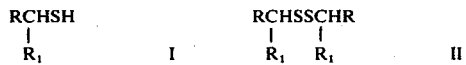

wherein R is aryl which may be substituted by alkyl, aralkyl or an electron releasing substituent, and $R_1$ is hydrogen, alkyl or aryl which may be substituted by alkyl, aralkyl or an electron releasing substituent, or R and $R_1$ taken together represent an alkylene chain of from 4 to 7 carbon atoms which may be substituted by alkyl, aralkyl, or aryl, which process comprises treating an α-amino nitrile of formula III

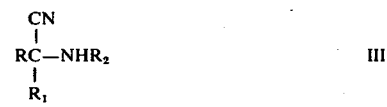

wherein R and $R_1$ are as defined above and $R_2$ is alkyl or aralkyl, with hydrogen sulphide and if desired oxidising a thiol of formula I to a disulphide of formula II.

6 Claims, No Drawings

NOVEL THIOLS AND DISULPHIDES

The invention relates to a new process for the preparation of thiols and disulphides and to some novel thiols and disulphides obtained thereby.

Thioamides are commonly prepared by reaction of nitriles with hydrogen sulphide usually in the presence of pyridine and triethylamine. Although the reaction between α-amino nitriles and hydrogen sulphide has been little investigated such reactions that have been reported have generally given thioamides as products. We have now surprisingly found that thiols and disulphides can be prepared, often in high yields, by reacting certain α-amino nitriles with hydrogen sulphide. This result is surprising since one would expect on the basis of the general literature that the products would be thioamides.

Accordingly the present invention provides a process for preparing a thiol of formula I or a disulphide of formula II,

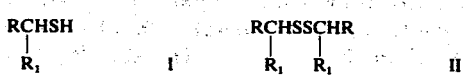

wherein R is aryl, or aryl substituted by alkyl, aralkyl or an electron releasing substituent, and $R_1$ is hydrogen, alkyl, aryl, or aryl substituted by alkyl, aralkyl or an electron releasing substituent, or R and $R_1$ taken together represent an alkylene chain of from 4 to 7 carbon atoms which may be substituted by alkyl, aralkyl or aryl, which process comprises treating an α-amino nitrile of formula III

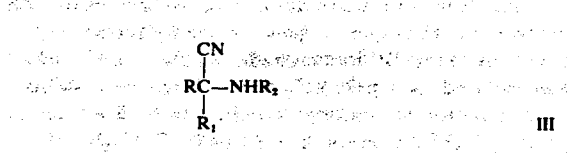

wherein R and $R_1$ are as defined above and $R_2$ is alkyl or aralkyl, with hydrogen sulphide, preferably in the presence of a base, and if desired or necessary oxidising a thiol of formula I to a disulphide of formula II.

The reaction with hydrogen sulphide is preferably carried out in the presence of a base, e.g. a tertiary amine such as a trialkylamine preferably triethylamine. A solvent e.g. a weakly basic solvent such as pyridine or lutidine may be used.

Examples of aryl groups used in the above formulae are phenyl and naphthyl. When an aryl group carries one or more electron releasing substituents such substituents include hydroxy, halogen, e.g. chlorine, bromine, fluorine or iodine, alkoxy, e.g. lower alkoxy such as methoxy, ethoxy, and propoxy, amino, substituted amino including mono and di-alkylamino and mono and di-aralkyl amino e.g. dimethylamino and dibenzylamino, and di-substituted amino in which the substituents are joined together to form a ring with the nitrogen of the amino, e.g. piperidino, morpholino and pyrrolidino. When an aryl group is phenyl it may be mono-substituted e.g. at the 4-position, disubstituted, e.g. at the 3 and 4 positions, or trisubstituted, e.g. at the 3,4 and 5 positions.

Alkyl groups used as groups R, $R_1$ and $R_2$ in the above formulae, or as substituents on other groups, include n-, s- and t-lower alkyl groups e.g. methyl, ethyl, n-, s- and t-butyl and cycloalkyl groups e.g. cyclobutyl, cyclopentyl and cyclohexyl. Aralkyl groups include aryl lower alkyl such as benzyl, phenethyl and phenpropyl.

Often the process of the invention gives the thiol or disulphide in high yield but sometimes a thioamide may be formed as a by-product. In general when R is aryl substituted by an electron releasing group formation of the thiol of disulphide predominates and when $R^2$ is also a branched chain alkyl or aralkyl group with a secondary or tertiary carbon atom attached directly to the nitrogen no significant amount of thioamide by-product appears to be formed.

The product of the process of the invention is initially a thiol but since thiols are readily oxidised to disulphides the thiols may oxidise in air to give the corresponding disulphides. This oxidation can be avoided by conducting the reaction in the absence of air e.g. under nitrogen. Where a disulphide is desired this can be formed by oxidation of the thiol e.g. by allowing the reaction mixture to stand or by bubbling air or oxygen through the mixture. Generally standard oxidation conditions for this reaction may be used see Kharasch, Organic Sulphur Compounds, Pergamon Press Oxford 1961, p. 97.

The disulphides may be reduced back to the thiols by standard means e.g. by sodium sulphide which gives the thiol as the sodium salt.

The thiols and disulphides prepared in this invention are either known compounds or are novel compounds. They have various uses. For instance 3,4-$(MeO)_2C_6H_3CH_2SH$ is an intermediate for the corresponding disulphide, diveratryl disulphide, which is itself a flavouring agent for foods and beverages (U.S. Pat. No. 2,957,919). Generally the thiols find application as corrosion inhibitors and reducing agents, e.g. in photographic compositions. The novel compounds are those of formula I or II wherein R is phenyl substituted by a single alkoxy group and $R_1$ is hydrogen and are included in the invention.

The α-amino nitrile starting materials of formula III are either known compounds or novel compounds which can be prepared from known intermediates as illustrated in the Examples below. The following examples illustrate the invention, temperatures being in °C.

EXAMPLE 1

3,4-Dimethoxybenzylmercaptan

α-Isopropylamino-α-(3,4-dimethoxyphenyl)acetonitrile was prepared from veratraldehyde according to the method of G. Morris (J.O.C. 1961, 26, 4741) and isolated in 79% yield as colourless needles from isopropylether m.p. 102°.

The aminonitrile (5 gm) was dissolved in a mixture of pyridine (20 ml.) and triethylamine (6 ml) and the solution treated with hydrogen sulphide at room temperature for 2 hours with stirring. The red solution was transferred to a sealed flask and allowed to stand at room temperature for 16 hours. Removal of the volatile material in vacuo gave a residual brown oil which was dissolved in ether (100 ml) and washed with water (3 × 15 ml), 2N̄, HCl(2 × 50 ml) and water (2 × 50 ml). The ethereal solution was dried and evaporated in vacuo to give the title compound as a pale yellow oil (3.7 gm., 92%).[GLC Rf=5½ min (10% × E 60, T=200; T̄=240)]. The acid extracts were combined and the pH adjusted to 12.0 with 2N̄ NaOH and extracted into ether (3 × 50 ml.). The combined ethereal extracts were washed with brine (2 × 50 ml.), dried and evaporated in vacuo to give no product (i.e. no starting material or aminothioamide).

The title compound was fully characterised by converting to the 2,4-dinitrophenyl ether as described by Vogel(Practical Organic Chemistry p.485). 3,4-Dimethoxybenzyl (2,4-dinitrophenyl)sulphide was isolated as yellow needles (95% yield) m.p. 159° [Found: C,51.75; H,4.13; N,7.87% $C_{15}H_{14}N_2O_6S$ requires: C,51.42; H,4.03; N,7.99%].

EXAMPLE 2

4-Methoxybenzyl disulphide.

α-Isopropylamino-α-(4-methoxyphenyl)acetonitrile was prepared according to the method of G. Morris et al. (J.O.C. 1961, 26, 4741) and isolated in 73% yield as a colourless oil which was further characterised as the hydrochloride, prepared by passing dry HCl gas into an ethereal solution, isolated as colourless needles m.pt. 123° (dec). [Found: C,60.01; H,7.30; N,11.31% $C_{12}H_{16}N_2O$ requires: C,59.87; H,7.12; N,11.64%].

The title compound was prepared from α-isopropylamino-α-(4-methoxyphenyl)acetonitrile, by the method described in Example I, and was isolated in 85% yield as colourless needles m.p. 101.6°. (Found: C,63.02; H,5.94% $C_{16}H_{18}S_2O_2$ requires: C,62.71; H,5.92%).

EXAMPLE 3

3,4-Dimethoxybenzylmercaptan

α-tert. Butylamino-α-(3,4-dimethoxyphenyl)acetonitrile was prepared according to the method of G. Morris (loc.cit.) and was isolated in 80% yield from isopropanol as colourless needles m.p. 69.5°.

The title compound was prepared from α-tert. butylamino-α-(3,4-dimethoxyphenyl)acetonitrile according to the method described in Example I and was isolated as a pale yellow oil *80% yield) which was identical by G.L.C. comparison (10% XE 60, T=200°, T-240° RF=5½ min) and infra-red comparison with the 3,4-dimethoxybenzyl mercaptan isolated in Example I.

EXAMPLE 4

α-Methylbenzylmercaptan.

α-Isopropylamino-α-phenylpropionitrile was prepared from acetophenone according to the method described in Org. Syn. Coll. Vol. IV, p.58. and was isolated as a colourless oil (96% yield) which was converted to the hydrochloride in the usual way (see Example 2) and was isolated as colourless needles m.p. 109° (isopropanol-ether). [Found: C,64.08; H,7.61; N,12.21% $C_{12}H_{16}N_2$.HCl requires C,64.14; H,7.62; N,12.46%].

The title compound was prepared from α-isopropylamino-α-phenylpropionitrile by the general method described in Example I, and was isolated as a colourless oil (96% yield) and characterised as the mercuric chloride derivative m.pt. 72°-5° [Found: Cl,8.39; S,9.53. HgCl($C_8H_9S$) requires: Cl,9.50; S,8.59%] (Lit. m.p. 73°-5° Ref. Beilstein Band 529 III, 1967.).

EXAMPLE 5

Cyclohexylmercaptan

α-Isopropylaminocyclohexanecarbonitrile was prepared from cyclohexanone according to the method of G. Morris (J.O.C. 1961, 26, 4741) and was isolated as a colourless oil (95% yield) which was fully characterised as the hydrochloride prepared in the usual way and isolated as colourless needles m.p. 132° (dec.). [Found: C,59.38; H,9.68; N,13.79%. $C_{10}H_{18}N_2$.HCl requires: C,59.25; H,9.45; N,13.82%].

Treatment of α-isopropylaminocyclohexanecarbonitrile with H₂S under the conditions described in Example I gave the title compound as a colourless oil (8% yield) with recovery of starting material from the acid-base extraction.

Reaction with H₂S for 7 hours and standing at R.T. for 3 days gave 34% yield of thiol + 60% starting material. Cyclohexylmercaptan was characterised as the 2,4 dinitrophenylthioether m.p. 148° (Vogel: Practical Org. Chem. p.486. m.p. 148°).

EXAMPLE 6

3,4-Dimethoxybenzyldisulphide.

α-Methylamino-α-(3,4-dimethoxybenzyl)acetonitrile was prepared from veratraldehyde according to the method of J. Klosa (J.Prakt. Chem., 1961, 12, 258–63) and converted to the hydrochloride in the usual way (see Example 2) (65% yield) m.p. 152°–4° (lit. 153°–4°) [Found: C,54.19; H,6.22; N,11.04%. $C_{11}H_{14}N_2O_2$ HCl requires: C,54.44; H,6.23; N,11.54%].

The title compound was prepared from α-methylamino-α-(3,4-dimethoxybenzyl)acetonitrile according to the general method described in Example I and isolated as a pale yellow solid *80% yield) which recrystallised from isopropanol as colourless needles m.p. 83°[Found: C,59.28; H,6.14%. $C_{18}H_{22}S_2$ requires: C,59.99; H,6.05%].

In addition, the acid-base extraction procedure described in Example I gave α-methylamino-α-(3,4-dimethoxybenzyl)thioacetamide (20% yield) which was isolated as a pale yellow solid and recrystallised from ethanol as creamy needles m.p. 204° (dec.) [Found: C,55.27; H,6.68; N,11.64%. $C_{11}H_{16}N_2SO_2$ requires: C,54.98; H,6.71; N,11.66%].

EXAMPLE 7

Benzylmercaptan

α-Isopropylamino-α-phenylacetonitrile was prepared from benzaldehyde according to the method of G. Morris (J.O.C.1961, 26, 4741) and was treated with H₂S as described in Example I to give the title compound as a colourless oil (56%) characterised as the 2,4-dinitrophenyl derivative m.p. 130° (Vogel-Practical Org.Chem. m.p. 130°). The title compound was slowly oxidised in air to benzyldisulphide m.p. 71.3° [Found: C,68.74; H,5.92%. $C_{14}H_{14}S_2$ requires: C,68.25; H,5.73%] (lit mpt.71°, Heilbron, Dictionary of Org.Compounds p.904 Hinsberg, Ber. 1912, 45, 2339). In addition, the acid-base extraction work up procedure gave α-isopropylamino-α-phenylthioacetamide as colourless needles (36% yield) m.p. 98.6° [Found: C,63.92; H,7.93; N,13.4%. $C_{11}H_{16}N_2S$ requires: C,63.39; H,7.74; N,13.48%].

We claim:
1. A process for preparing a thiol of formula

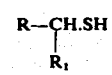

wherein R is a member of the group consisting of phenyl, lower alkoxy phenyl and dilower alkoxy phenyl and $R_1$ is hydrogen or lower alkyl or R and $R_1$ taken together represent a polymethylene chain of from 4 to 7 carbon atoms which process comprises treating an α-aminonitrile of formula

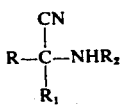

wherein R and $R_1$ are as defined above and $R_2$ is lower alkyl, with hydrogen sulphide in the presence of a pyridine solvent and a lower trialkylamine base and thereafter recovering the product.

2. A process as claimed in claim 1, wherein the base is triethylamine.

3. A process as claimed in claim 1 when carried out in a solvent selected from pyridine and lutidine.

4. A process as claimed in claim 1, wherein a compound is used in which R is lower alkoxy phenyl or dilower alkoxyphenyl and in which $R_2$ is a branched chain lower alkyl group with a secondary or tertiary carbon atom attached directly to the nitrogen atom of the amino group.

5. A process as claimed in claim 4, in which $R_2$ is isopropyl or t-butyl.

6. A process as claimed in claim 4, in which R is mono- or di-methoxy phenyl.

* * * * *